(12) United States Patent
Son et al.

(10) Patent No.: US 7,885,527 B2
(45) Date of Patent: Feb. 8, 2011

(54) FOCUSING APPARATUS AND METHOD

(75) Inventors: Hyuk-soo Son, Changwon (KR); Hong-ju Kim, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 12/228,191

(22) Filed: Aug. 8, 2008

(65) Prior Publication Data

US 2009/0129767 A1 May 21, 2009

(30) Foreign Application Priority Data

Nov. 21, 2007 (KR) .................. 10-2007-0119296

(51) Int. Cl.
*G03B 3/00* (2006.01)
*G03B 13/00* (2006.01)

(52) U.S. Cl. .................. 396/124; 348/349; 382/255

(58) Field of Classification Search .................. 396/89, 396/124, 127, 137; 348/345, 349; 382/255
See application file for complete search history.

(56) References Cited

U.S. PATENT DOCUMENTS

2004/0066563 A1   4/2004   Voss et al.
2008/0158409 A1*  7/2008   Gotanda .............. 348/348
2008/0201637 A1*  8/2008   Shirasaki ............. 715/705
2008/0219654 A1*  9/2008   Border et al. .......... 396/89
2008/0226278 A1*  9/2008   Garg et al. ............ 396/123

FOREIGN PATENT DOCUMENTS

EP      0 263 510 A2      4/1988
WO      WO 00/72584 A1   11/2000
WO      WO 2008/003348 A1 1/2008

OTHER PUBLICATIONS

Vinall, Sally; Search Report from UK Intellectual Property Office; Oct. 7, 2008.*

* cited by examiner

*Primary Examiner*—Christopher E Mahoney
*Assistant Examiner*—Autumn Parker
(74) *Attorney, Agent, or Firm*—Drinker Biddle & Reath LLP

(57) ABSTRACT

A focusing apparatus and method are provided for a digital image processing apparatus. The focusing apparatus and method control an image sensor to read only pixels within a preset region of an image, calculate a focus value using only the read pixels, and apply the focus value to the entire image. The focusing apparatus includes: a region setting unit setting an arbitrary focus region of an image; a set region pixel reading unit reading only pixels within the set focus region; a focus value calculating unit calculating a maximum focus value according to a moving distance of a focus lens for achieving an in-focus state with respect to the pixels within the focus region read by the set region pixel reading unit; and a control unit applying the calculated maximum focus value to the entire image.

18 Claims, 7 Drawing Sheets

(a) 401: FOCUS REGION DIRECTLY SET BY USER: IMAGE SENSOR 33-4 READS ONLY PIXELS OF REGION 401

(b) 403: FOCUS REGION SET TO CENTRAL REGION: IMAGE SENSOR 33-4 READS ONLY PIXELS OF REGION 403

(c) 405: FOCUS REGION SET TO FACE RECOGNIZING REGION: IMAGE SENSOR 33-4 READS ONLY PIXELS OF REGION 405

FOCUS TIME: TIME TAKEN TO READ ONLY
PIXELS OF SET FOCUS REGION +
MOVING TIME OF FOCUS LENS

FIG. 8

FOCUSING APPARATUS AND METHOD

CROSS-REFERENCE TO RELATED PATENT APPLICATION

This application claims the benefit of Korean Patent Application No. 10-2007-0119296, filed on Nov. 21, 2007, in the Korean Intellectual Property Office, the disclosure of which is incorporated herein in its entirety by reference.

BACKGROUND OF THE INVENTION

1. Field of the Invention

The present invention relates to a digital image processing apparatus and a method of operating the same, and more particularly, to a focusing apparatus and method which enables an image sensor to read only pixels within a preset region of an image, calculates a focus value using the read pixels, and applies the calculated focus value to the entire image.

2. Description of the Related Art

In general, digital image processing apparatuses convert an electrical image signal of an object into a digital signal using a sensor such as a charge coupled device (CCD) or a complementary metal oxide semiconductor (CMOS), and stores the digital signal using a compression/recovery unit or outputs the digital image using an output unit.

Such digital image processing apparatuses perform autofocusing to correctly focus an object. The autofocusing is performed by calculating a focus value using an edge, which is output after an image signal is processed by a sensor such as a CCD or a CMOS, for every picture, determining a moving direction and a moving distance of a focus lens on the basis of the calculated focus value, and moving the focus lens in the determined moving direction by the determined moving distance.

In an autofocus mode, the sensor such as a CCD or a CMOS, reads all pixels of the object at a rate of 30 frames per second (FPS). For example, when one frame comprises 256 pixels, a time taken to read one pixel at a rate of 30 FPS is 0.117 ms. Accordingly, a time taken to read all the 256 pixels is approximately 30 ms. In a high-speed autofocus mode, pixels of some lines are read and pixels of other lines are skipped in order to reduce a time taken to read the pixels. For example, when pixels of a first line are read and pixels of a third line are skipped, since only 64 pixels among 256 pixels are read, a time taken to read the 64 pixels is approximately 7.488 ms (133 FPS).

However, although pixels of some lines are read and pixels of other lines are skipped as described above, there are still a lot of pixels to be read by the sensor. Accordingly, conventional digital image processing apparatuses have limitations in increasing a focusing speed, and actually read unnecessary pixels as well.

SUMMARY OF THE INVENTION

The present invention provides a focusing apparatus and method that enables an image sensor to read only pixels within a preset region of an image, calculates a focus value using the read pixels, and applies the calculated focus value to the entire image.

According to an aspect of the present invention, there is provided a focusing apparatus comprising: a region setting unit setting an arbitrary focus region of an image; a set region pixel reading unit reading only pixels within the set focus region; a focus value calculating unit calculating a maximum focus value according to a moving distance of a focus lens for achieving an in-focus state with respect to the pixels within the focus region read by the set region pixel reading unit; and a control unit applying the calculated maximum focus value to the entire image.

The focus region may be set by a user.

The focus region may be set to a central region comprising predetermined pixel blocks.

The focus region may be set to a face recognizing region.

The focusing apparatus may further comprise a face recognizing unit detecting the number and positions of faces from the image, when the focus region is set to the face recognizing region.

According to another aspect of the present invention, there is provided a focusing apparatus comprising: a region setting unit setting an arbitrary focus region of an image; a set region pixel reading unit reading only pixels within an adjacent pixel region comprising the set focus region; a focus value calculating unit calculating a maximum focus value according to a moving distance of a focus lens for achieving an in-focus state with respect to the pixels within the adjacent pixel region comprising the set focus region read by the set region pixel reading unit; and a control unit applying the calculated maximum focus value to the entire image.

The focus region may be set by a user.

The focus region may be set to a central region comprising predetermined pixel blocks.

The focus region may be set to a face recognizing region.

The focusing apparatus may further comprise a face recognizing unit detecting the number and positions of faces from the image, when the focus region is set to the face recognizing region.

According to another aspect of the present invention, there is provided a focusing method comprising: setting an arbitrary focus region of an image; reading only pixels within the set focus region; calculating a maximum focus value according to a moving distance of a focus lens for achieving an in-focus state with respect to the pixels within the read focus region; applying the calculated maximum focus value to the entire image.

The setting of the arbitrary focus region may comprise: the user setting the focus region; setting the focus region to a central region comprising predetermined pixel blocks; or setting the focus region to a face recognizing region.

The focusing method may further comprise detecting the number and positions of faces from the image, when the focus region is set to the face recognizing region.

According to another aspect of the present invention, there is provided a focusing method comprising: setting an arbitrary focus region from an image; reading only pixels within an adjacent pixel region comprising the set focus region; calculating a maximum focus value according to a moving distance of a focus lens for achieving an in-focus state with respect to the pixels within the read adjacent pixel region comprising the set focus region; and applying the calculated maximum focus value to the entire image.

The setting of the arbitrary focus region may comprise the user setting the focus region, setting the focus region to a central region comprising predetermined pixel blocks, or setting the focus region to a face recognizing region.

The focusing method may further comprise detecting the number and positions of faces from the image, when the focus region is set to the face recognizing region.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
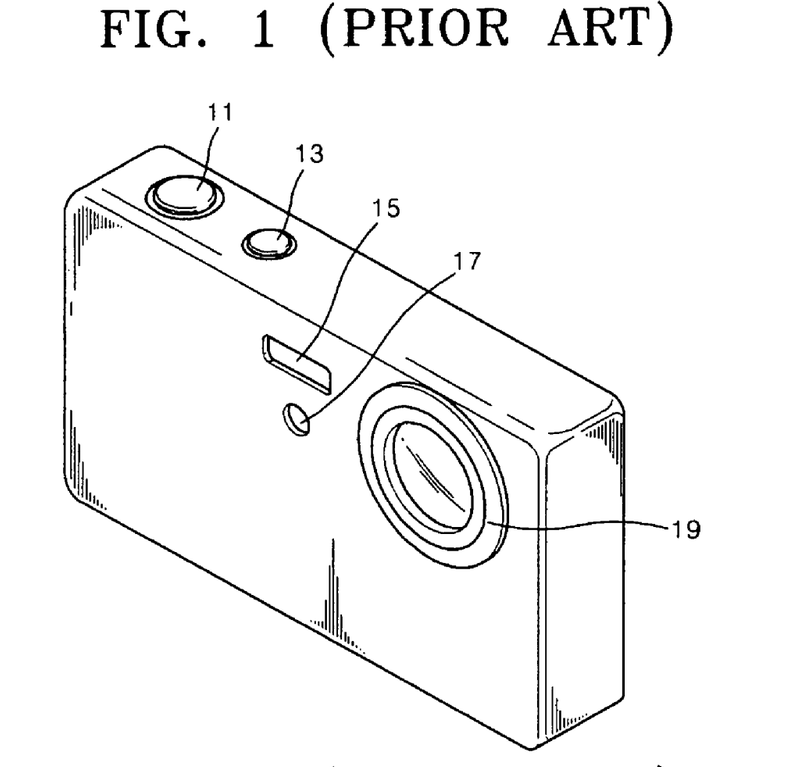
FIG. 1 is a perspective view illustrating the front and the top of a conventional digital image processing apparatus.

FIG. 1 is a perspective view illustrating the front and the top of a conventional digital image processing apparatus.

Referring to FIG. 1, the digital image processing apparatus includes a shutter-release button 11, a power button 13, a flash unit 15, an auxiliary light unit 17, and a lens unit 19. The shutter-release button 11 is pressed to expose a charge coupled device (CCD) to light for a predetermined period of time, and works together with an iris (not shown) to properly expose an object to light and record an image of the object on the CCD.

The shutter-release button 11 is pressed by a user to generate first and second image photographing signals. If the shutter-release button 11 is depressed half-way, the digital image processing apparatus performs focusing and adjusts the amount of light. When correct focus is achieved, a focus indication may be provided to the user, for example a green light or icon may be illuminated on a display unit 23 in FIG. 2. After the shutter-release button 11 is depressed half-way, the correct focus is obtained, and the amount of light is adjusted, the shutter-release button 11 is completely depressed to take shots.

The power button 13 is pressed to supply power to the digital image processing unit and operate the digital image processing apparatus. The flash unit 15 provides a momentary light when an image is photographed in the dark. Flash modes include an auto flash mode, a fill flash mode, a no flash mode, a red-eye reduction mode, and a slow synchronization mode.

The auxiliary light unit 17 supplies light to an object (e.g., when the object lacks illumination or is photographed at night) so that the digital image processing apparatus can perform autofocusing quickly and accurately.

The lens unit 19 receives light reflected from an object so that the apparatus can process an image.

Figure 2:
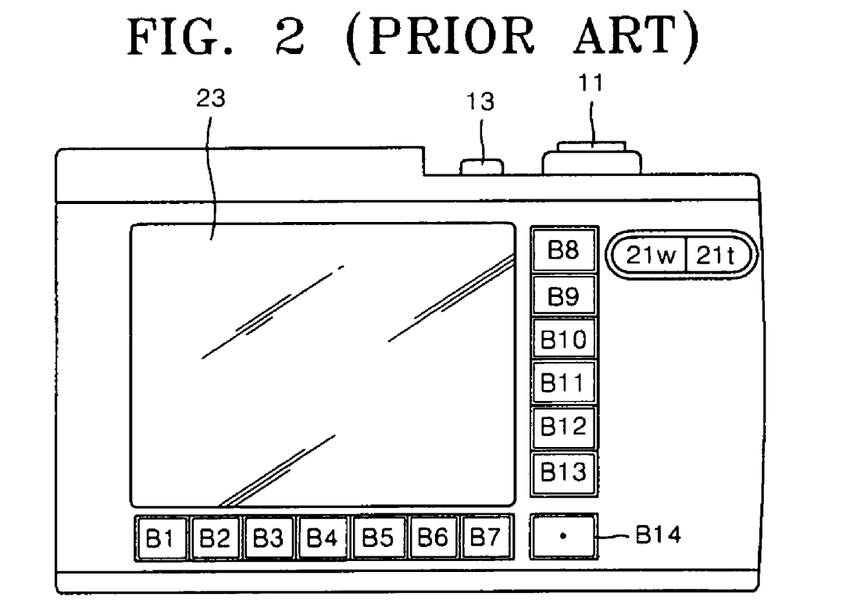
FIG. 2 is a rear view illustrating the back of the conventional digital image processing apparatus of FIG. 1.

FIG. 2 is a rear view illustrating the back of the conventional digital image processing unit of FIG. 1. The back of the digital image processing apparatus includes a wide angle-zoom button 21$w$, a telephoto-zoom button 21$t$, a display unit 23, and input buttons B1 through B14.

When the wide angle-zoom button 21$w$ or the telephoto-zoom button 21$t$ is pressed, an angle of view is widened or narrowed. In particular, the wide angle-zoom button 21$w$ or the telephoto-zoom button 21$t$ is pressed to change a selected area. When the wide angle-zoom button 21$w$ is pressed, the selected area is reduced, and when the telephoto-zoom button 21$t$ is pressed, the selected area is expanded.

The input buttons B1 through B14 are vertically and horizontally arranged adjacent to the display unit 23. Each of the input buttons B1 through B14 vertically and horizontally arranged adjacent to the display unit 23 includes a touch sensor (not shown) or a contact switch (not shown). As is known in the art, a touch sensor does not require as firm a touch as a contact switch.

If a touch sensor is included in each of the input buttons B1 through B14, an arbitrary item, e.g., color or brightness, among main menu items, or a sub menu icon included in a main menu icon may be selected by the user moving his or her fingertip over or on the horizontally aligned buttons B1 through B7 or the vertically aligned buttons B8 through B14 in various directions.

If a contact switch is included in each of the buttons B1 through B14, the main-menu icon and the sub-menu icon may be directly selected to activate corresponding functions.

Figure 3:
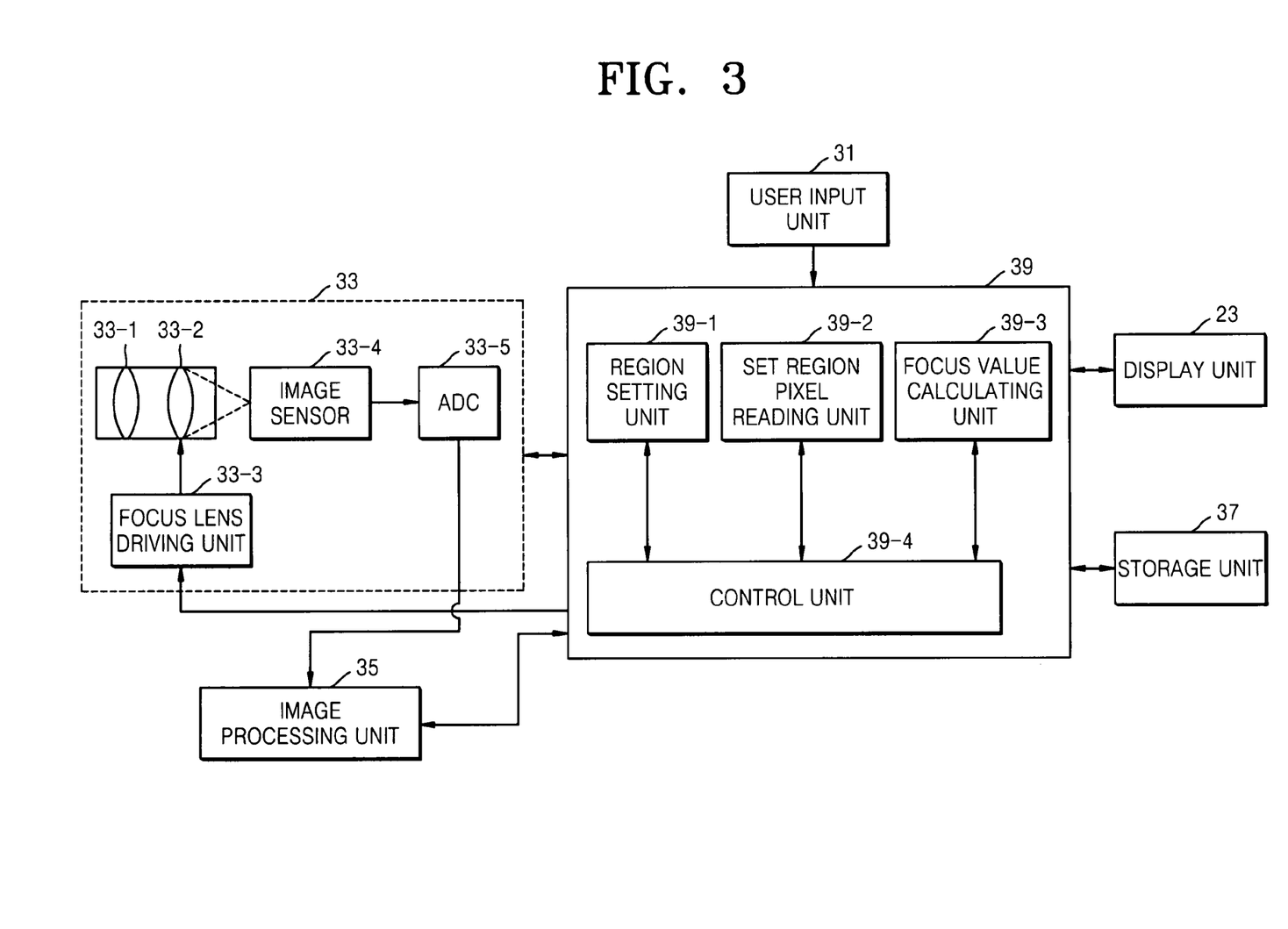
FIG. 3 is a block diagram of a focusing apparatus according to an embodiment of the present invention.

FIG. 3 is a block diagram of a focusing apparatus according to an embodiment of the present invention. Referring to FIG. 3, the focusing apparatus according to the current embodiment of the present invention includes a display unit 23, a user input unit 31, an image pickup unit 33, an image processing unit 35, a storage unit 37, and a digital signal processing unit 39.

The user input unit 31 includes a shutter-release button 11 which is pressed to expose a CCD to light for a predetermined period of time, a power button 13 supplying power, a wide angle-zoom button 21$w$ and a telephoto-zoom button 21$t$ widening or narrowing an angle of view, and input buttons B1 through B14 vertically and horizontally arranged adjacent to the display unit 23 to input characters and each including a touch sensor or a contact switch.

The image pickup unit 33 includes a zoom lens 33-1, a focus lens 33-2, a focus lens driving unit 33-3, an image sensor 33-4, an analog-to-digital converter (ADC) 33-5, a shutter (not shown), and an iris (not shown).

The shutter and the iris work together to adjust the amount of light received by the image sensor 33-4. The zoom lens 33-1 and the focus lens 33-2 receive light from an external light source and process an image. The iris adjusts its size according to the amount of incident light. The size of the iris is controlled by the digital signal processing unit 39.

The optical axis of each of the zoom lens 33-1 and the focus lens 33-2 is aligned with the optical center of a light receiving surface of the image sensor 33-4. The focus lens 33-2 is movable linearly along the optical axis. The focus lens 33-2 is moved to focus an image on the light receiving surface of the image sensor 33-4. The focus lens 33-2 is moved by the focus lens driving unit 33-3 under the control of the digital signal processing unit 39.

The image sensor 33-4 collects the amount of light input through the zoom lens 33-1 and the focus lens 33-2, and outputs the image taken by the zoom lens 33-1 and the focus lens 33-2 corresponding to the collected amount of light in response to a vertical sync signal. The image sensor 33-4, which converts light reflected by an object into an electrical signal, serves to capture an image. In order to acquire a color image, the image sensor 33-4 needs a color filter. A color filter array (CFA, not shown) is generally used. A CFA is an array of color filters regularly placed over the image sensor 33-4 in which each pixel in the CFA transmits light of only one color. The CFA may have various arrangements. The ADC 33-5 converts an analog image signal which is output from the image sensor 33-4 into a digital image signal.

The image processing unit 35 processes digital raw data from the ADC 33-5 into processed data that can be displayed or stored. The image processing unit 35 removes a black level caused by a dark current generated in the CFA and the image sensor 33-4 which are sensitive to a temperature change. The image processing unit 35 performs gamma correction that encodes information based on non-linear human visual response. The image processing unit 35 also performs CFA interpolation that interpolates missing color in a Bayer pattern comprised of RGRG lines and GBGB lines of the gamma corrected information into RGB lines to complete an RGB signal. The image processing unit 35 converts the RGB signal into a YUV signal, performs edge compensation that filters a Y signal using a high pass filter and obtains a clear image, and color correction that corrects color values of U and V signals using standard color coordinates, and removes noise of the Y, U, and V signals. The image processing unit 35 compresses and processes the Y, U, and V signals whose noise are removed to generate a joint photographic experts group (JPEG) file. The generated JPEG file is displayed on the display unit 23, and is stored in the storage unit 37. The operations of the image processing unit 35 may be performed under the control of or in cooperation with the digital signal processing unit 39.

The digital signal processing unit 39 according to the current embodiment of the present invention does not control the image sensor 33-4 to read all pixels of an image, but rather it controls the image sensor 33-4 to read only pixels within a set focus region such that a focus value is calculated using the read pixels and is applied to the entire image, thereby reducing a time taken for the image sensor 33-4 to read pixels and increasing a focusing speed.

To this end, the digital signal processing unit 39 includes a region setting unit 39-1, a set region pixel reading unit 39-2, a focus value calculating unit 39-3, and a control unit 39-4.

Digital signal processing units 39 according to two example embodiments of the present invention will now be explained. In a first embodiment, the digital signal processing unit 39 reads only pixels within a preset focus region, calculates a maximum focus value from the read pixels, and then performs focusing. In a second embodiment, the digital signal processing unit 39 reads only pixels within an "adjacent" pixel region that includes the preset focus region of the first embodiment, calculates a maximum focus value from the read pixels, and performs focusing.

The first embodiment, that is, the digital signal processing unit 39 which reads only pixels within a preset focus region, calculates a maximum focus value from the read pixels, and then performs focusing, will now be explained.

The region setting unit 39-1 receives a region set signal from the user input unit 31, and sets an arbitrary region for calculating a focus value. The control unit 39-4 stores coordinate information of the focus region which is set by the region setting unit 39-1.

A focus region may be set in various ways. In the present embodiment, the focus region may be set in one of three ways: by a user; to a central region of an image; and to a face recognizing region. The control unit 39-4 may provide a menu to a user (i.e., displaying a menu on the display unit 23) for setting the focus region. The user may select a menu item or sub-menu, e.g., a user direct setting, a central region setting, or a face recognizing region setting, in the menu. The focus region may be set in other ways.

FIGS. 4A through 4C illustrate various example focus regions (shown by cross-hatched pixels) that may be set by the digital signal processing unit 39 of the focusing apparatus of FIG. 3 according to an embodiment of the present invention. Referring to FIG. 4A, the user may set a focus region of an image after watching a live view of the image or a viewfinder view of the image. In FIG. 4A, the user directly sets a focus region 401 comprised of 4 pixel blocks using the buttons B1 through B14 (FIG. 2). Although the focus region 401 of FIG. 4A is comprised of 4 pixel blocks arranged in a square configuration, the present invention is not limited thereto. That is, for example, the focus region 401 may be rectangular, circular or defined by other polylinear or curvilinear shapes known in the art. Also, the directly set focus region 401 may be moved to a desired position using the buttons B1 through B14. Accordingly, it can be appreciated that the user may select a size, shape, and location for the focus region 401, thereby customizing the region 401 as desired. For example, instead of selecting a portion of the horse's head that includes an eye, the user could alternatively select a different portion of the horse's body such as a leg, foot, torso, tail, etc. or even a different object such as the tree (or portion thereof) shown behind the horse.

Referring to FIG. 4B, a focus region 403 is set to a central region of an image.

Referring to FIG. 4C, a focus region 405 is set to a face recognizing region of an image.

When the focus region 405 is set to the face recognizing region as shown in FIG. 4C, the digital signal processing unit 39 further includes a face recognizing unit (not shown) to detect face information regarding the number and positions of faces. The face recognizing unit sets the face recognizing region using detected face information. A feature-based face detection method of the face recognizing unit is used to locate obvious features on the face, such as eyes, nose, lips, material or skin color. Since skin color among the features is less sensitive to variations in the movement, rotation, and size of the face, skin color is often used. A template-based face detection method of the face recognizing unit defines several standard patterns for a face, stores the patterns, and compares an image with one of the stored patterns in a search widow. A support vector machine (SVM) based face detection method of the face recognizing unit is most often used presently. The SVM-based face detection method sub-samples different regions from an image, discriminates a face from a non-face portion of the image using a detector, and then finds a face from the image. Since the face detection methods of the face recognizing unit are already well known, detailed explanations thereof are omitted for brevity.

The set region pixel reading unit 39-2 reads only pixels within the focus region that is set by the region setting unit 39-1. To this end, when the shutter-release button 11 is depressed half-way, the control unit 39-4 fetches coordinate information it has stored of the set focus region, and transmits the fetched coordinate information to the image sensor 33-4.

The image sensor 33-4 transmits the pixels (or pixel information) within the set focus region to the set region pixel reading unit 39-2.

In FIG. 4A, the set region pixel reading unit 39-2 reads only pixels within the focus region 401 directly set by the user. In FIG. 4B, the set region pixel reading unit 39-2 reads only pixels within the focus region 403 set to the central region. In FIG. 4C, the set region pixel reading unit 39-2 reads only pixels within the focus region 405 set to the face recognizing region.

The focus value calculating unit 39-3 calculates, under the control of the control unit 39-4, a maximum focus value according to a moving distance of the focus lens 33-2 for achieving an in-focus state with respect to the pixels read by the set region pixel reading unit 39-2.

Figure 6:
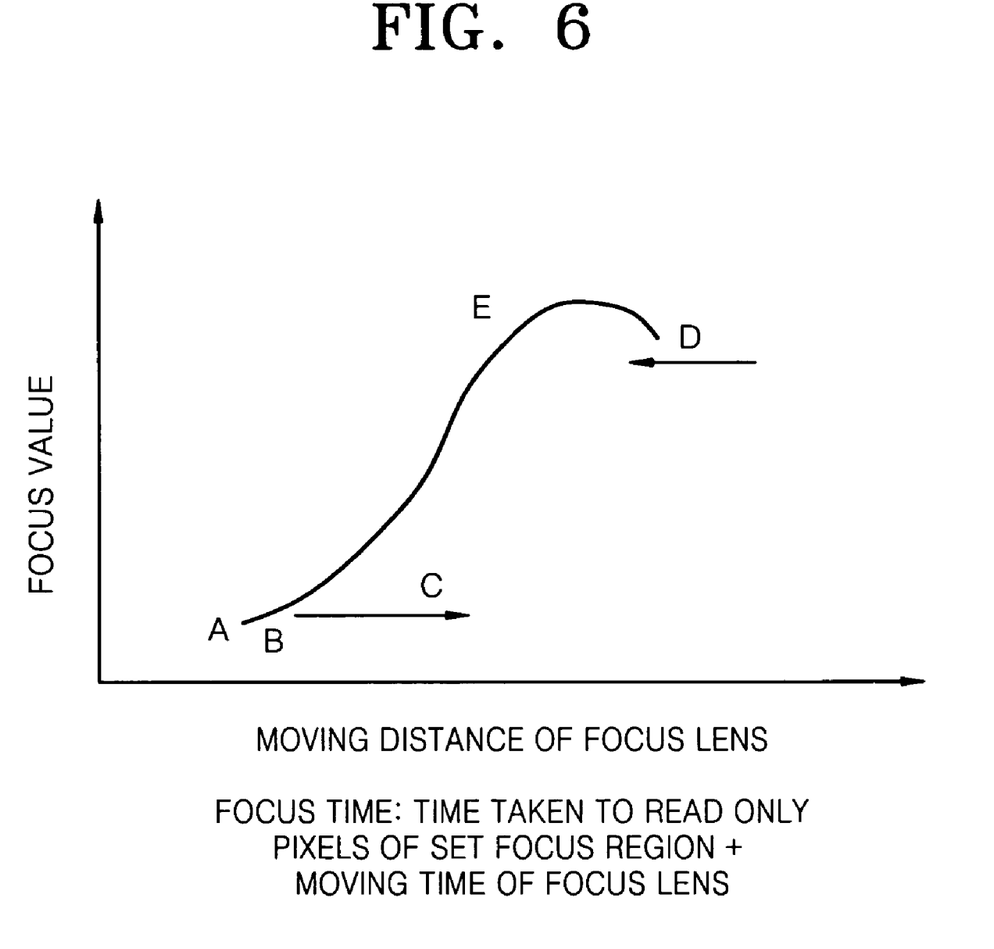
FIG. 6 is a graph illustrating a relationship between a focus value and a moving distance of a focus lens.

FIG. 6 is a graph for explaining a maximum focus value according to a moving distance of the focus lens 33-2 for achieving an in-focus state, which is calculated from the pixels within the focus region 401, 403, or 405 set by the focus value calculating unit 39-3. If correct focus is not achieved within the focus region 401, 403, or 405, a low focus value A is obtained. In this case, the moving direction of the focus lens 33-2 is determined at a point B to become a direction C. When the focus lens 33-2 is moved in the direction C and passes by a point E where a maximum focus value is obtained, the focus lens 33-2 is moved back in a direction D toward the point E, and then is fixed to the point E, thereby finding the maximum focus value.

A time taken to find a maximum focus value according to an embodiment of the present invention is a sum of a time taken to read the pixels within the focus region (i.e., one of 401, 403, and 405) by the set region pixel reading unit 39-2 and a moving time of the focus lens 33-2.

The focus value calculating unit 39-3 continuously exchanges data with the control unit 39-4, and the control unit 39-4 receives a signal output from the focus value calculating unit 39-3 and controls the focus lens driving unit 33-3 to find a maximum focus value. Once the focus value calculating unit 39-3 calculates the maximum focus value, the control unit 39-4 performs focusing by applying the calculated maximum focus value to the entire image. If the shutter-release button 11 is completely depressed, the control unit 39-4 captures an image adjusted with the maximum focus value and stores the adjusted image in the storage unit 37.

Since the set region pixel reading unit 39-2 according to an embodiment of the present invention reads only pixels of the set focus region 401, 403, or 405 and finds a maximum focus value, a time taken to read pixels can be significantly reduced compared with conventional image sensors that read substantially all pixels. Accordingly, a focusing speed can be increased, compared with a conventional digital signal processing unit.

A second embodiment, the digital signal processing unit 39 which reads only pixels within an "adjacent" pixel region including the preset focus region of the first embodiment, calculates a maximum focus value from the read pixels, and performs focusing, will now be explained.

The region setting unit 39-1 receives a region set signal from the user input unit 31, and sets an arbitrary focus region for calculating a focus value.

Figure 5:
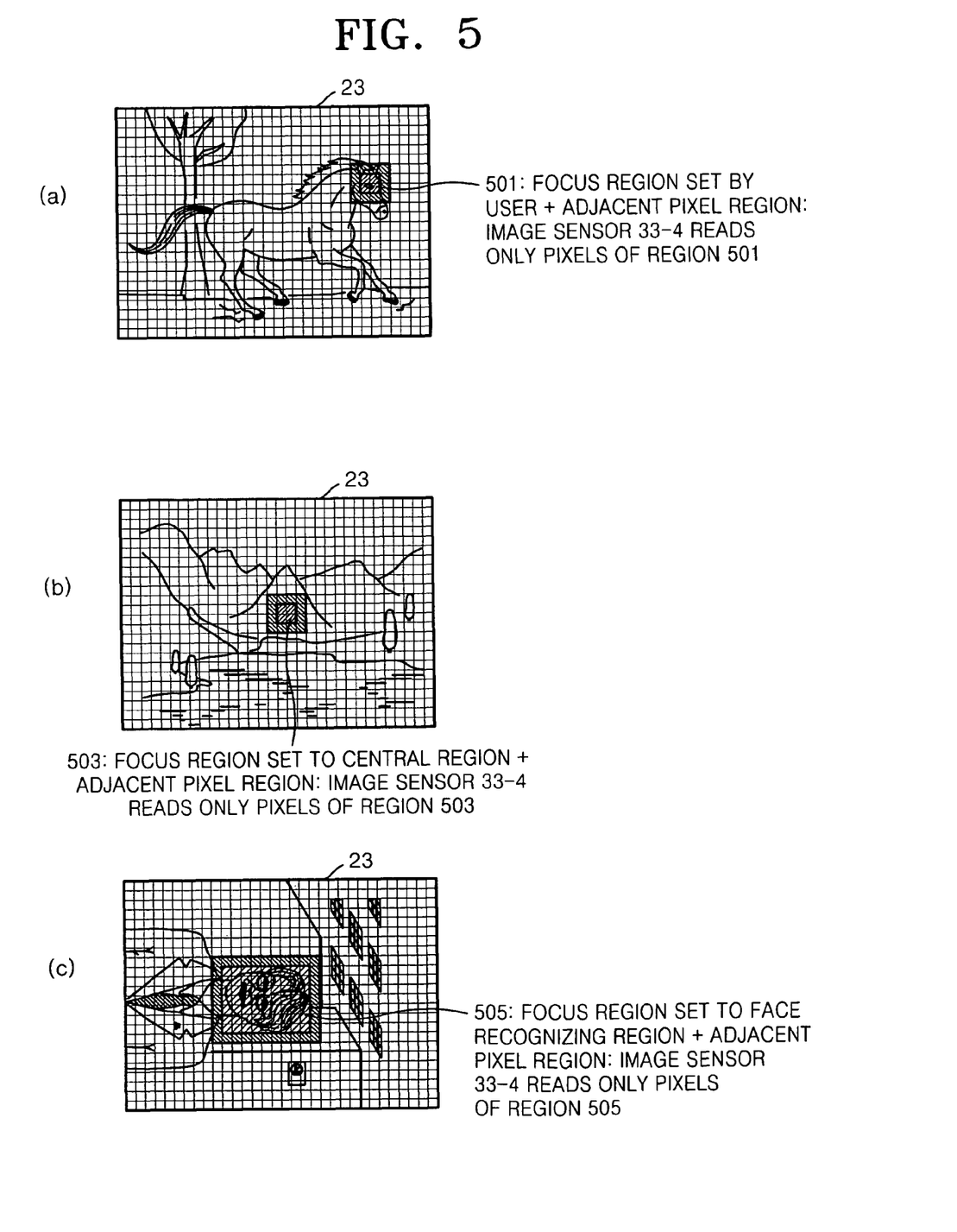
FIG. 5, portions (a) through (c), which are referred to hereinafter as FIGS. 5A through 5C, illustrate focus regions set by the digital signal processing unit of the focusing apparatus of FIG. 3, according to another embodiment of the present invention.

FIGS. 5A through 5C illustrate various example focus regions (shown by cross-hatched pixels) that may be set by the digital signal processing unit 39 of the focusing apparatus of FIG. 3, according to the second embodiment of the present invention. Referring to FIG. 5A, while a user watches a live view of the subject or a viewfinder view of the image the user may set a focus region of an image. After the focus region is set, the control unit 39-4 may store coordinate information of the focus region which was defined or configured by the user, and may set an adjacent pixel region 501 that includes the focus region directly set by the user to define a final focus region. Alternatively, the control unit 39-4 may store coordinate information of the focus region directly set by the user and the adjacent pixel region 501 including the focus region set by the user, and may set the adjacent pixel region 501 including the focus region set by the user as a final focus region.

While the focus region 401 directly set by the user in FIG. 4A is comprised of 4 pixel blocks, the adjacent pixel region 501 which is established by the second embodiment once the user sets the focus region 401 is comprised of 16 pixel blocks. That is, the pixel region 501 is defined by a central region (i.e., region 401 of 4 pixels) that is set by the user and an otherwise supplemental or augmenting region (i.e., a generally square ring shaped pixel area of 12 pixels that surrounds the region 401).

Referring to FIG. 5B, an adjacent pixel region 503 being a central region may be set as a final focus region. Once a focus region is set to a central region, the control unit 39-4 stores coordinate information of the central region, and the adjacent pixel region 503 including the central region may be set as a final focus region. Alternatively, the control unit 39-4 may store coordinate information of the central region and the adjacent pixel region 503 including the central region, and the adjacent pixel region 503 including the central region may be set as a final focus region.

While the focus region 403 set to the central region in FIG. 4B is comprised of 4 pixel blocks, the adjacent pixel region 503 including the central region in FIG. 5B is comprised of 16 pixel blocks. During the region setting operation, the image processing unit 35 or one or more units of the digital signal processing unit 39 may augment or otherwise change the focus region 403 to define the adjacent pixel region 503, which is the four pixel region 403 surrounded by a square ring of 12 pixels.

Referring to FIG. 5C, an adjacent pixel region 505 including a face recognizing region may be set as a final focus region. When the adjacent pixel region 505 including the face recognizing region is set as the final focus region, the digital signal processing unit 39 further includes a face recognizing unit (not shown) in order to detect the number and positions of faces.

Once a focus region is set to the face recognizing region as shown in FIG. 5C, the control unit 39-4 stores coordinate information of the face recognizing region, and the adjacent pixel region 505 including the face recognizing region may be set as a final focus region. Alternatively, the control unit 39-4 may store coordinate information of the face recognizing region and the adjacent pixel region 505 including the face recognizing region, and the adjacent pixel region 505 including the face recognizing region may be set as a final focus region.

The set region pixel reading unit 39-2 reads only pixels within the adjacent pixel region including the focus region set by the region setting unit 39-1. To this end, when the shutter-release button 11 is depressed half-way, the control unit 39-4 fetches stored coordinate information of the focus region, and transmits the coordinate information to the image sensor 33-4. The image sensor 33-4 transmits only the pixels within the adjacent pixel region including the set focus region corresponding to the coordinate information to the set region pixel reading unit 39-2.

In FIG. 5A, the set region pixel reading unit 39-2 reads only pixels within the adjacent pixel region 501 including the focus region directly set by the user. In FIG. 5B, the set region pixel reading unit 39-2 reads only pixels within the adjacent pixel region 503 including the focus region set to the central region. In FIG. 5C, the set region pixel reading unit 39-2 reads only pixels within the adjacent pixel region 505 including the focus region set to the face recognizing region.

The focus value calculating unit 39-3 calculates a maximum focus value according to a moving distance of the focus lens 33-2 for achieving an in-focus state with respect to the pixels read by the set region pixel reading unit 39-2, under the control of the control unit 39-4. Since the operations of the focus value calculating unit 39-3 and the control unit 39-4 are the same as described previously, an explanation thereof will not be repeated for brevity.

Figure 4:
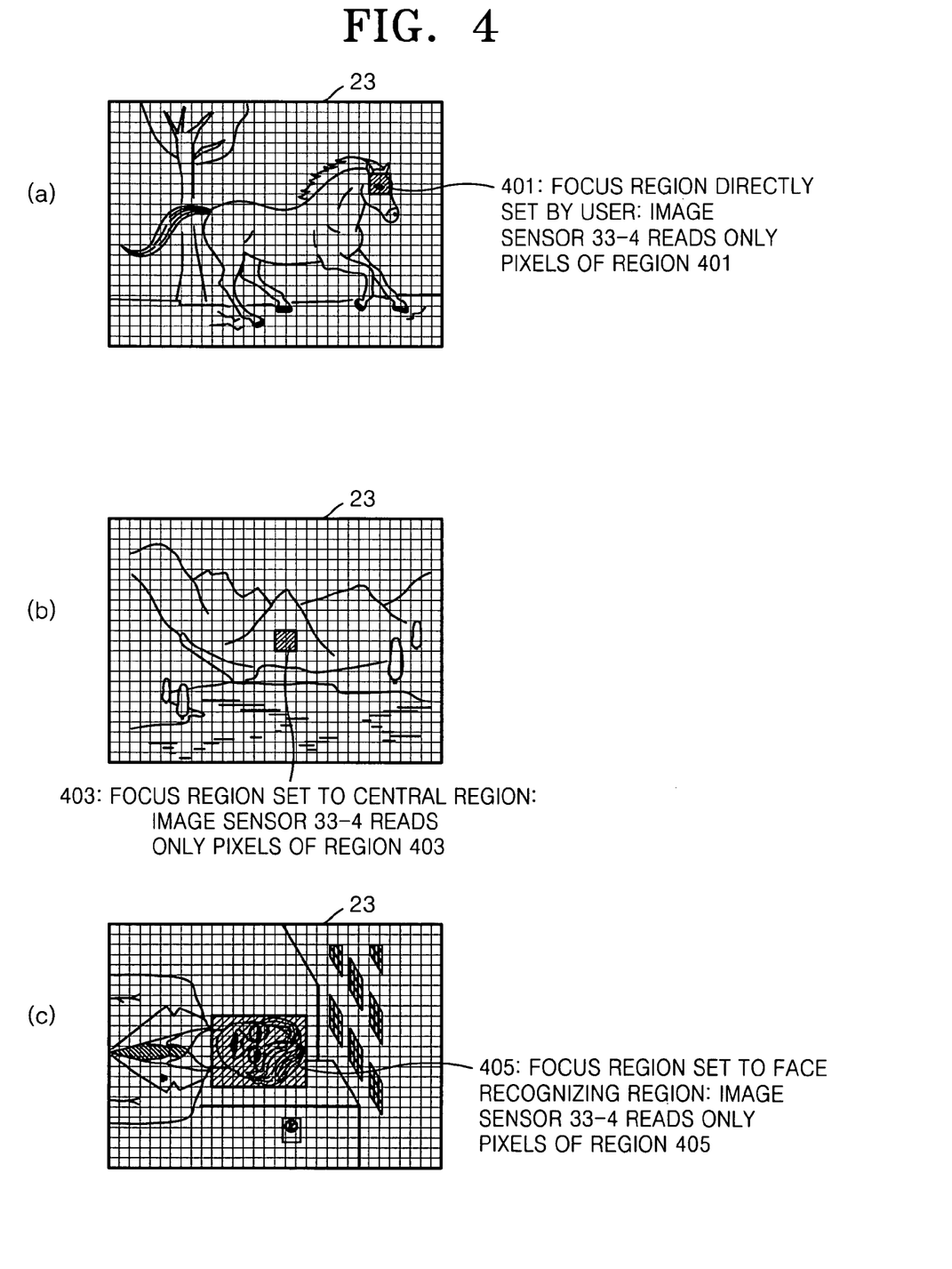
FIG. 4, portions (a) through (c), which are referred to hereinafter as FIGS. 4A through 4C, illustrate focus regions set by a digital signal processing unit of the focusing apparatus of FIG. 3, according to an embodiment of the present invention.

Although the digital signal processing unit 39 setting the focus region 501, 503, or 505 has more pixels to process than the digital signal processing unit 39 of FIG. 4 setting the focus region 401, 403, or 405, the number of pixels to be read is much less than that of a conventional digital signal processing unit, thereby improving a focusing speed.

Focusing methods according to embodiments of the present invention will now be explained with reference to FIGS. 7 and 8. The focusing methods may be performed in the focusing apparatus of FIG. 3. A main photographing method using the present focusing methods may be performed in the digital signal processing unit 39 in conjunction with peripheral components in the digital image processing apparatus.

Figure 7:
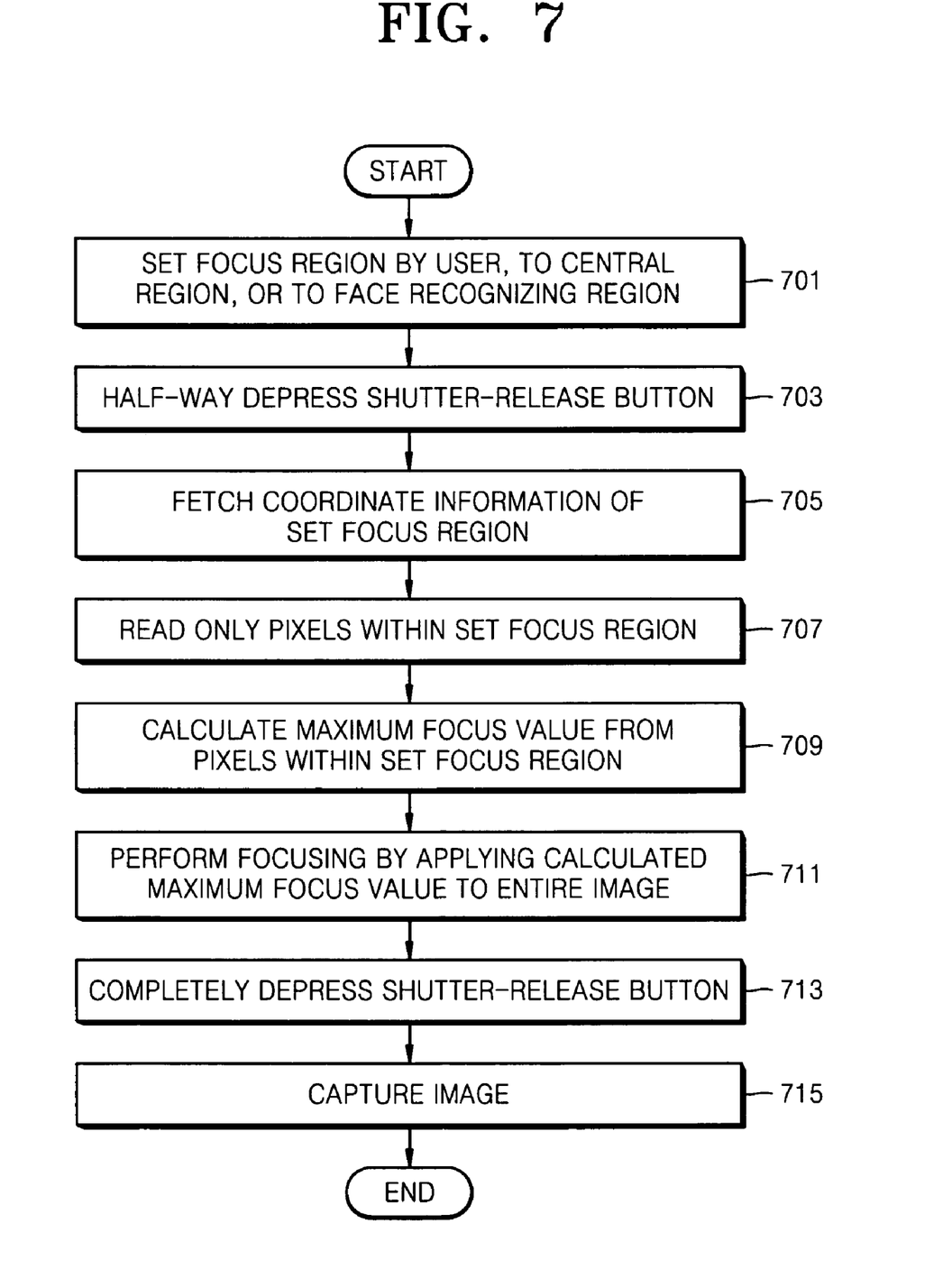
FIG. 7 is a flowchart illustrating a focusing method according to an embodiment of the present invention.

FIG. 7 is a flowchart illustrating a focusing method according to an embodiment of the present invention.

Referring to FIG. 7, in operation 701, the digital signal processing unit 39 receives a focus region select signal from a user, and sets a focus region of an image using the focus region select signal. The digital signal processing unit 39 stores coordinate information of the set focus region. The digital signal processing unit 39 may provide a menu for setting a focus region to the user, and the user may select a desired sub menu in the menu. The menu may include three menu items or sub menus, that is, a focus region may be selected in three ways. The focus region may be directly set by the user, may be set to a central region of an image, and may be set to a face recognizing region of the image. Since the setting of the focus region has already been described in detail with reference to FIGS. 4A through 4C, an explanation thereof will not be repeated for brevity.

In operation 703, the shutter-release button 11 is depressed half-way by a user to initiate photographing, and the digital signal processing unit 39 receives a signal indicating that the shutter-release button 11 is depressed half-way.

In operation 705, the digital signal processing unit 39 fetches coordinate information of the set focus region.

In operation 707, the digital signal processing unit 39 reads only pixels within the set focus region. To this end, once the shutter-release button 11 is depressed half-way, the digital signal processing unit 39 fetches stored coordinate information of the set focus region, and transmits the coordinate information of the set focus region to the image sensor 33-4. The image sensor 33-4 transmits only the pixels or pixel information of the pixels within the set focus region to the digital signal processing unit 39.

In operation 709, the digital signal processing unit 39 calculates a maximum focus value according to a moving distance of the focus lens 33-2 for achieving an in-focus state with respect to the pixels within the set focus region. Since the calculating of the maximum focus value from the pixels within the set focus region has already been explained in detail, an explanation will not be repeated for brevity.

In operation 711, the digital signal processing unit 39 performs focusing by applying the calculated maximum focus value to the entire image.

In operation 713, the shutter-release button 11 is completely depressed by a user to capture a focused image, and the digital signal processing unit 39 receives a signal indicating that the shutter-release button 11 is completely depressed. In operation 715, the digital signal processing unit 39 captures an image adjusted with the maximum focus value and stores the adjusted image in the storage unit 37.

Figure 8:
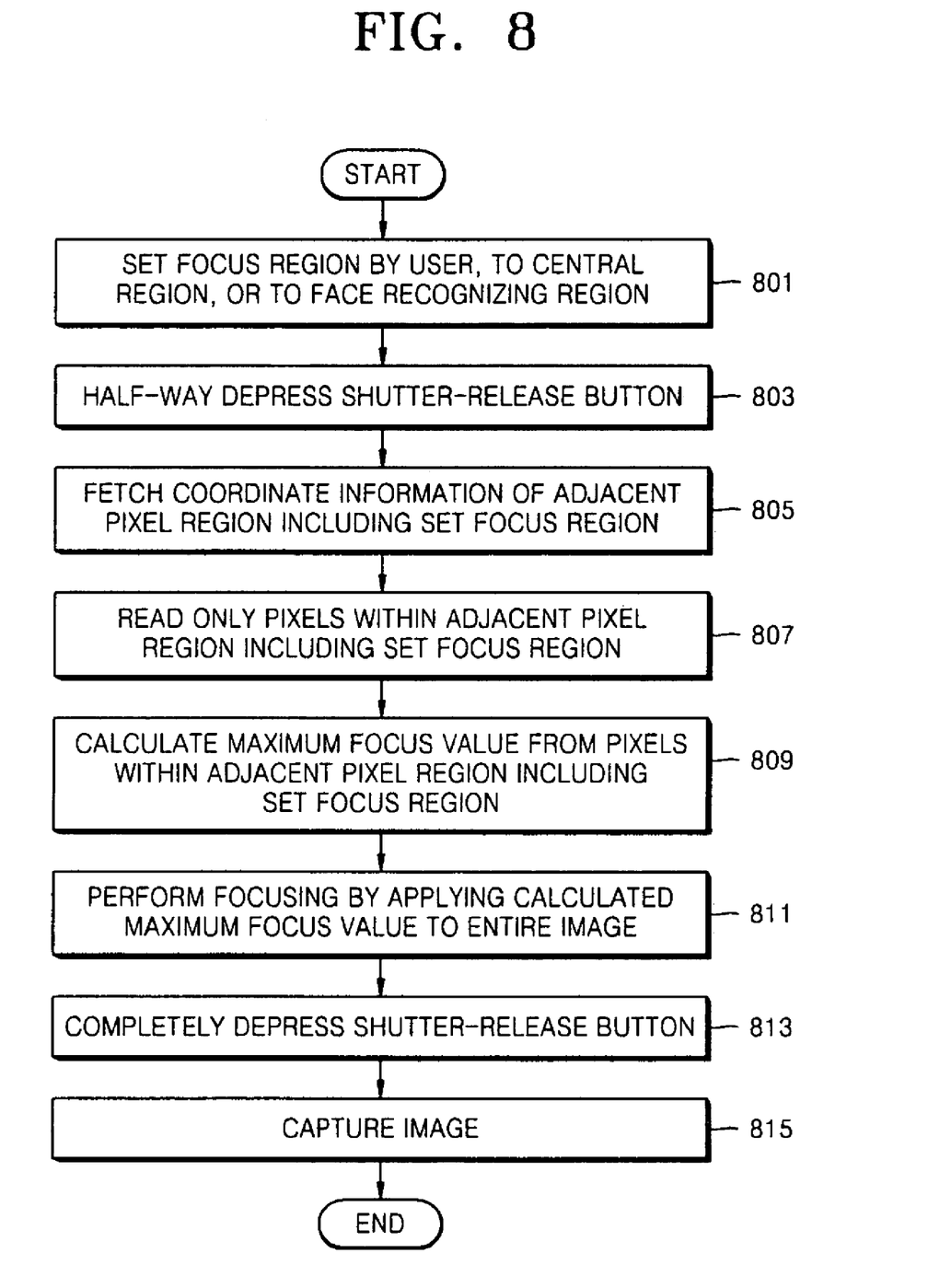
FIG. 8 is a flowchart illustrating a focusing method according to another embodiment of the present invention.

FIG. 8 is a flowchart illustrating a focusing method according to another embodiment of the present invention.

In operation 801, the digital signal processing unit 39 receives a focus region select signal from a user and sets a focus region using the focus region select signal. The digital signal processing unit 39 stores coordinate information of the set focus region. The region setting unit 39-1 of FIG. 8 sets an adjacent pixel region including a preset focus region as a final focus region unlike the region setting unit 39-1 of FIG. 7. Since the setting of the final focus region has already been explained in detail with reference to FIG. 5, an explanation thereof will not be repeated for brevity.

In operation 803, the shutter-release button 11 is depressed half-way by a user to initiate photographing, and the digital signal processing unit 39 receives a signal indicating that the shutter-release button 11 is depressed half-way.

In operation 807, the digital signal processing unit 39 reads only pixels within the adjacent pixel region that includes the set focus region. To this end, once the shutter-release button 11 is depressed half-way, the digital signal processing unit 39 fetches stored coordinate information, and transmits the coordinate information to the image sensor 33-4. The image sensor 33-4 transmits only the pixels within the adjacent pixel region including the set focus region corresponding to the coordinate information to the digital signal processing unit 39.

In operation 809, the digital signal processing unit 39 calculates a maximum focus value according to a moving distance of the focus lens 33-2 for achieving an in-focus state with respect to the pixels within the adjacent pixel region 501, 503, or 505 including the set focus region. Since the calculating of the maximum focus region from the pixels within the adjacent pixel region 501, 503, or 505 including the set focus region has already been explained, an explanation thereof will not be repeated for brevity.

In operation 811, the digital signal processing unit 39 performs focusing by applying the calculated maximum focus value to the entire image.

In operation 813, the shutter-release button 11 is completely depressed by a user to capture a focused image and the digital signal processing unit 39 receives a signal that the shutter-release button 11 is completely depressed. In operation 815, the digital signal processing unit 39 captures an image adjusted with the maximum focus value and stores the adjusted image in the storage unit 37.

As described above, since a focus region is directly set by a user in advance to a central region or a face recognizing region, a focus value is calculated by reading only pixels within the preset region, and the calculated focus value is applied to an entire image, thereby increasing the focusing speed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A focusing apparatus comprising:
   a region unit for setting a focus region of an image;
   a set region pixel unit for reading only pixels within the focus region set by the region unit;
   a focus value unit for calculating a maximum focus value according to a moving distance of a focus lens for achieving an in-focus state with respect to only the pixels within the focus region and determining the focus values within the focus region after the region has been set; and
   a control unit applying the maximum focus value to the focus lens for capturing the image.

2. The focusing apparatus of claim 1, further comprising a user interface in communication with the region unit, the user interface providing a menu to the user for selecting the focus region.

3. The focusing apparatus of claim 2, wherein the menu includes at least one of a menu item and a submenu for the user to select a user-configured focus region.

4. The focusing apparatus of claim 2, wherein the menu includes at least one of a menu item and a submenu for the user to select a central region of the image as the focus region.

5. The focusing apparatus of claim 2, wherein the menu includes at least one of a menu item and a submenu for the user to select a face recognizing region as the focus region.

6. The focusing apparatus of claim 5, further comprising a face recognizing unit detecting at least one face from the image.

7. A focusing apparatus comprising:
   a region unit for setting a focus region of an image according to a user-selected focus region;
   a set region pixel unit for augmenting the user-selected focus region and reading only pixels within an augmented pixel region that includes the user-selected focus region;
   a focus value unit for calculating a maximum focus value according to a moving distance of a focus lens for achieving an in-focus state with respect to the pixels within the augmented pixel region and determining the focus values within the augmented pixel region after the region has been set; and
   a control unit applying the maximum focus value calculated by the focus value unit to the entire image.

8. The focusing apparatus of claim 7, further comprising a user interface in communication with the region unit, the user interface providing a menu to the user for selecting the focus region.

9. The focusing apparatus of claim 8, wherein the menu includes at least one of a menu item and a submenu for the user to select a user-configured focus region.

10. The focusing apparatus of claim 8, wherein the menu includes at least one of a menu item and a submenu for the user to select a central region of the image as the focus region.

11. The focusing apparatus of claim 8, wherein the menu includes at least one of a menu item and a submenu for the user to select a face recognizing region as the focus region.

12. The focusing apparatus of claim 11, further comprising a face recognizing unit detecting at least one face from the image.

13. A focusing method comprising:
    setting a focus region of an image, the focus region having substantially fewer pixels than the image;
    reading only pixels within the focus region;
    calculating a maximum focus value of a focus lens that achieves an in-focus state for only the pixels within the focus region and determining the focus values within the focus region after the region has been set;
    applying the maximum focus value to the entire image.

14. The focusing method of claim 13, wherein the setting step comprises:
    displaying a focus region-setting menu to a user, the menu including a first item for effecting a user-configured focus region, a second item for effecting a central focus region, and a third item for effecting a face recognizing focus region; and
    determining user selection of one of the first, second and third items.

15. The focusing method of claim 14, wherein the third item is determined to be selected and the method further comprises the step of:
    detecting at least one face from the image; and
    defining the face recognizing focus region to substantially encompass the at least one face from the image.

16. The focusing method of claim 13 wherein the setting step further comprises expanding the focus region with additional pixels of the image to enlarge the focus region.

17. The focusing method of claim 16 wherein the expanding step comprises:
    determining a configuration of pixels of the focus region; and
    supplementing the configuration with adjacent pixels.

18. The focusing method of claim 17 wherein the supplementing step comprises:
    determining, relative to the configuration, coordinate information for pixels of the focus region;
    storing the coordinate information;
    identifying pixels that surround the configuration; and
    changing the coordinate information to include additional coordinate information relative to the pixels that surround the configuration.

* * * * *